US009871455B2

(12) United States Patent
Ohtake et al.

(10) Patent No.: US 9,871,455 B2
(45) Date of Patent: *Jan. 16, 2018

(54) CURRENT RESONANCE TYPE POWER SUPPLY DEVICE

(71) Applicant: Sanken Electric Co., Ltd., Niiza-shi, Saitama (JP)

(72) Inventors: Osamu Ohtake, Niiza (JP); Ryuichi Furukoshi, Asaka (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/474,291

(22) Filed: Mar. 30, 2017

(65) Prior Publication Data
US 2017/0207714 A1 Jul. 20, 2017

Related U.S. Application Data

(62) Division of application No. 14/493,659, filed on Sep. 23, 2014, now Pat. No. 9,774,262.

(30) Foreign Application Priority Data

Sep. 30, 2013 (JP) .................................. 2013-203153

(51) Int. Cl.
$H02M\ 3/335$ (2006.01)
$H02M\ 1/08$ (2006.01)
$H02M\ 1/00$ (2006.01)

(52) U.S. Cl.
CPC ....... *H02M 3/33546* (2013.01); *H02M 1/083* (2013.01); *H02M 2001/0009* (2013.01); *H02M 2001/0032* (2013.01)

(58) Field of Classification Search
CPC ............ H02M 3/335; H02M 3/33507; H02M 2007/4815; H02M 3/33546; H02M 2001/0032; H02M 7/537; H02M 7/5387
USPC ........... 363/21.02, 21.03, 21.09, 21.1, 21.11, 363/21.17, 21.18, 97
See application file for complete search history.

(56) References Cited

U.S. PATENT DOCUMENTS

| 2008/0266908 | A1* | 10/2008 | Halberstadt ......... H02M 3/3376 363/21.02 |
| 2012/0134705 | A1* | 5/2012 | Fukutani ........... H02M 3/33569 399/88 |
| 2014/0368167 | A1* | 12/2014 | Okura ..................... H02J 5/005 320/109 |

* cited by examiner

*Primary Examiner* — Alex Torres-Rivera
(74) *Attorney, Agent, or Firm* — Metrolexis Law Group, PLLC

(57) ABSTRACT

The present invention includes: a series circuit formed of a reactor Lr, a primary winding P of a transformer T, and a capacitor C2; a full-wave rectifier/smoothing circuit D1, D2, C3 configured to perform full-wave rectification and smoothing on a voltage generated in a secondary winding S of the transformer thereby to extract a DC voltage; a control circuit FF1 configured to set a first ON time of the first switch element Q1 and a second ON time of the second switch element Q2 to the same predetermined time thereby to alternately turn on and off the first switch element and the second switch element; and a first ON time controller I1, 16, C7 configured to set one of the first ON time and the second ON time, shorter than the predetermined time, under light-load conditions, based on the DC voltage detected by a detector 11.

2 Claims, 17 Drawing Sheets

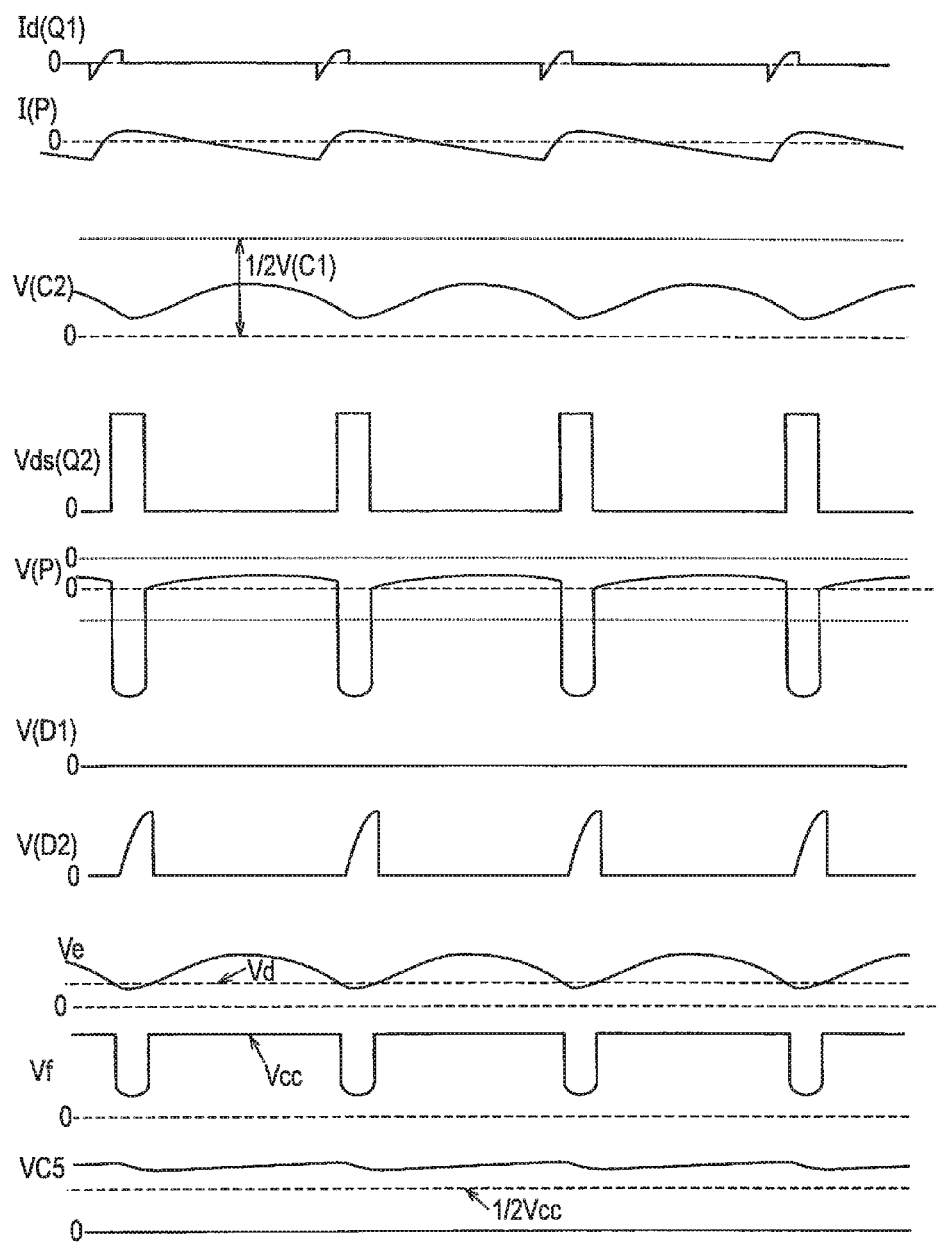

US 9,871,455 B2

1

CURRENT RESONANCE TYPE POWER SUPPLY DEVICE

This application is a divisional of application Ser. No. 14/493,659, filed on Sep. 23, 2014, which is based upon and claims the benefit of priority from the prior Japanese Patent Application No. 2013-203153, filed on Sep. 30, 2013, the entire contents of which are incorporated herein by reference.

TECHNICAL FIELD

The present invention relates to a current resonance type power supply device and more particularly to output voltage control of a current resonance type power supply device under light load.

BACKGROUND ART

FIG. 1 is a circuit diagram illustrating a conventional current resonance type power supply device. In FIG. 1, a smoothing capacitor C1 is connected across output ends of a full-wave rectifier circuit RC1 which rectifies an AC (alternating current) voltage, and a series circuit of a switch element Q1 and a switch element Q2 each constructed of a MOSFET (metal oxide semiconductor field effect transistor) is connected across the output ends of the full-wave rectifier circuit RC1. The switch element Q1 and the switch element Q2 are alternately turned on and off. A series circuit of a resonance reactor Lr, a primary winding P of a transformer T and a current resonance capacitor C2 is connected across ends of the switch element Q2.

A secondary winding S1 and a secondary winding S2 of the transformer T are connected in series, an anode of a diode D1 is connected to one end of the secondary winding S1, and an anode of a diode D2 is connected to one end of the secondary winding S2. A cathode of the diode D1 and a cathode of the diode D2 are connected to one end of a smoothing capacitor C3, and the other end of the smoothing capacitor C3 is connected to a junction of the one end of the secondary winding S1 and the one end of the secondary winding S2. A detector 11 is connected to both ends of the smoothing capacitor C3. Incidentally, a leakage inductance of the transformer T may be used in place of the resonance reactor Lr.

The detector 11 detects an output voltage from the smoothing capacitor C3 and outputs the output voltage to an oscillator 13. The oscillator 13 generates a frequency signal obtained by varying an oscillation frequency according to the output voltage from the smoothing capacitor C3. A comparator CM1 outputs a high level if the frequency signal from the oscillator 13 is equal to or more than a divided voltage obtained by dividing a voltage of a power supply Vcc by a resistor R1 and a resistor R2, or the comparator CM1 outputs a low level if the frequency signal from the oscillator 13 is less than the divided voltage obtained by dividing the voltage of the power supply Vcc by the resistor R1 and the resistor R2.

An inverter IN1 inverts an output from the comparator CM1 and uses the inverted output to turn on or off the switch element Q2. A high-side driver 12 uses the output from the comparator CM1 to turn on or off the switch element Q1.

Next, description will be given with regard to operation of the conventional current resonance type power supply device. First, when the switch element Q1 is turned on, an electric current flows through a route from the full-wave rectifier circuit RC1 through the switch element Q1, the

2 resonance reactor Lr, the primary winding P, and the current resonance capacitor C2 to the full-wave rectifier circuit RC1. The electric current is a combined current of an excitation current flowing through an excitation inductance Lp on a primary side of the transformer T, and a load current supplied from an output terminal OUT to a load through the primary winding P, the secondary winding S2, the diode D2, and the capacitor C3. The former current is a resonance current in the form of a sinusoidal wave of (the reactor Lr plus the excitation inductance Lp) and the current resonance capacitor C2, and is observed as a current in which a portion of the sinusoidal wave is in the form of a triangular wave, since the current is set to a lower resonance frequency than that during an ON period of the switch element Q1. The latter current is a resonance current in the form of a sinusoidal wave in which a resonance element of the reactor Lr and the current resonance capacitor C2 appears.

When the switch element Q1 is turned off, energy of the excitation current stored in the transformer T produces voltage pseudo-resonance by (the reactor Lr plus the excitation inductance Lp) and the current resonance capacitor C2, and a voltage resonance capacitor Cry (not illustrated) on both ends of the switch element Q2. At this time, a resonance frequency generated by the voltage resonance capacitor Cry having a small capacitance is observed as a voltage across the switch element Q1 and the switch element Q2. In other words, the current of the switch element Q1 shifts to the voltage resonance capacitor Cry as soon as the switch element Q1 is turned off. When the voltage resonance capacitor Cry is discharged to zero volt, the current shifts to an internal diode of the switch element Q2. The energy of the excitation current stored in the transformer T charges the current resonance capacitor C2 through the internal diode of the switch element Q2. During this period, the switch element Q2 is turned on thereby to enable the switch element Q2 to become a zero-volt switch.

When the switch element Q2 is turned on, with the current resonance capacitor C2 acting as a power supply, an electric current flows through a route from the current resonance capacitor C2 through the primary winding P, the resonance reactor Lr, and the switch element Q2 to the current resonance capacitor C2. The electric current is a combined current of an excitation current flowing through the excitation inductance Lp of the transformer T, and a load current supplied from the output terminal OUT to the load through the primary winding P, the secondary winding S1, the diode D1, and the smoothing capacitor C3. The former current is a resonance current in the form of a sinusoidal wave of (the reactor Lr plus the excitation inductance Lp) and the current resonance capacitor C2, and is observed as a current in which a portion of the sinusoidal wave is in the form of a triangular wave, since the current is set to a lower resonance frequency than that during an ON period of the switch element Q2. The latter current is a resonance current in the form of a sinusoidal wave in which a resonance element of the reactor Lr and the current resonance capacitor C2 appears.

When the switch element Q2 is turned off, energy of the excitation current stored in the transformer T produces voltage pseudo-resonance by (the reactor Lr plus the excitation inductance Lp) and the current resonance capacitor C2, and the voltage resonance capacitor Cry. At this time, a resonance frequency generated by the voltage resonance capacitor Cry having a small capacitance is observed as a voltage across the switch element Q1 and the switch element Q2. In other words, the current of the switch element Q2 shifts to the voltage resonance capacitor Cry as soon as the switch element Q2 is turned off. When the voltage resonance capacitor Cry is discharged to the output voltage from the smoothing capacitor C1, the current shifts to an internal diode of the switch element Q1. The energy of the excitation current stored in the transformer T is regenerated to the current resonance capacitor C1 through the internal diode of the switch element Q1. During this period, the switch element Q1 is turned on thereby to enable the switch element Q1 to become a zero-volt switch.

FIG. 2 illustrates waveforms of portions of the conventional current resonance type power supply device under light load. In FIG. 2, Id(Q1) represents a drain current of the switch element Q1; I(P), a current flowing through the primary winding P; V(C2), a voltage across ends of the current resonance capacitor C2; Vds(Q2), a drain-source voltage of the switch element Q2; V(P), a voltage across ends of the primary winding P; V(D1), a voltage across ends of the diode D1; and V(D2), a voltage across ends of the diode D2.

Also, in the conventional current resonance type power supply device, the switch element Q1 and the switch element Q2 are repeatedly alternately turned on and off at a duty ratio of 50% to control a switching frequency and thereby control an output voltage. At this time, as illustrated in FIG. 2, the voltage V(C2) of the current resonance capacitor C2 repeats charging and discharging symmetrically about ½ of a voltage across ends of a voltage V(C1) of the smoothing capacitor C1. Thereby, the voltage V(P) is generated in the primary winding P, a voltage is generated in the secondary windings S1, S2, and the voltage is rectified by the diodes D1, D2 thereby to obtain an output voltage.

Incidentally, a current resonance type power supply device described for example in Japanese Patent Application Publication No. 2013-78228 and Japanese Unexamined Patent Application Publication No. Hei 7-135769 is known as the related art of the prior art.

However, in the conventional current resonance type power supply device, when an excitation current of the transformer T capable of providing a necessary supply of power to a secondary side under heavy-load conditions is set, the excitation current of the transformer T, even under light-load conditions, flows as a large current and does not become zero, as illustrated in FIG. 2. Also, under the light-load conditions, the switching frequency becomes high, and consequently, even if the excitation current of the transformer T is reduced as compared to that under the heavy-load conditions, a loss of the current resonance type power supply device taken as a whole is not greatly reduced. Thus, efficiency is reduced.

An object of the present invention is to provide a current resonance type power supply device which improves efficiency by reducing an excitation current of a transformer, or equivalently, a charging/discharging current and loss of a current resonance capacitor, under light-load conditions.

SUMMARY OF INVENTION

A current resonance type power supply device according to a first aspect of the invention includes: a first switch element and a second switch element connected in series across ends of a DC (direct current) power supply; a series circuit connected to a junction of the first switch element and the second switch element and to one end of the DC power supply, and having a series connection of a reactor, a primary winding of a transformer, and a capacitor; a full-wave rectifier/smoothing circuit configured to perform full-wave rectification and smoothing on a voltage generated in a secondary winding of the transformer thereby to extract a DC voltage; a control circuit configured to set a first ON time of the first switch element and a second ON time of the second switch element to a same predetermined time under heavy-load conditions thereby to alternately turn on and off the first switch element and the second switch element; a detector configured to detect the DC voltage from the full-wave rectifier/smoothing circuit; and a first ON time controller configured to set one of the first ON time of the first switch element and the second ON time of the second switch element, shorter than the predetermined time, under light-load conditions, based on the DC voltage detected by the detector.

Also, a current resonance type power supply device according to a second aspect of the invention includes: a first switch element and a second switch element connected in series across ends of a DC power supply; a series circuit connected to a junction of the first switch element and the second switch element and to one end of the DC power supply, and having a series connection of a reactor, a primary winding of a transformer, and a capacitor; a full-wave rectifier/smoothing circuit configured to perform full-wave rectification and smoothing on a voltage generated in a secondary winding of the transformer thereby to extract a DC voltage; a control circuit configured to set a first ON time of the first switch element and a second ON time of the second switch element to a same predetermined time thereby to alternately turn on and off the first switch element and the second switch element, and configured to control a switching frequency of the first switch element and the second switch element according to a value of the DC voltage; a current detector configured to detect a current of the capacitor; and a fifth ON time controller configured to set one of the first ON time and the second ON time shorter than the predetermined time and set the other of the first ON time and the second ON time longer than the predetermined time, under light-load conditions, based on a value of the current detected by the current detector.

BRIEF DESCRIPTION OF DRAWINGS

FIG. 17 is a chart illustrating waveforms of the portions of the current resonance type power supply device according to Embodiment 5 of the present invention under light load.

DESCRIPTION OF EMBODIMENTS

Some embodiments of a current resonance type power supply device of the present invention will be described in detail below with reference to the drawings.

Embodiment 1

Figure 3:
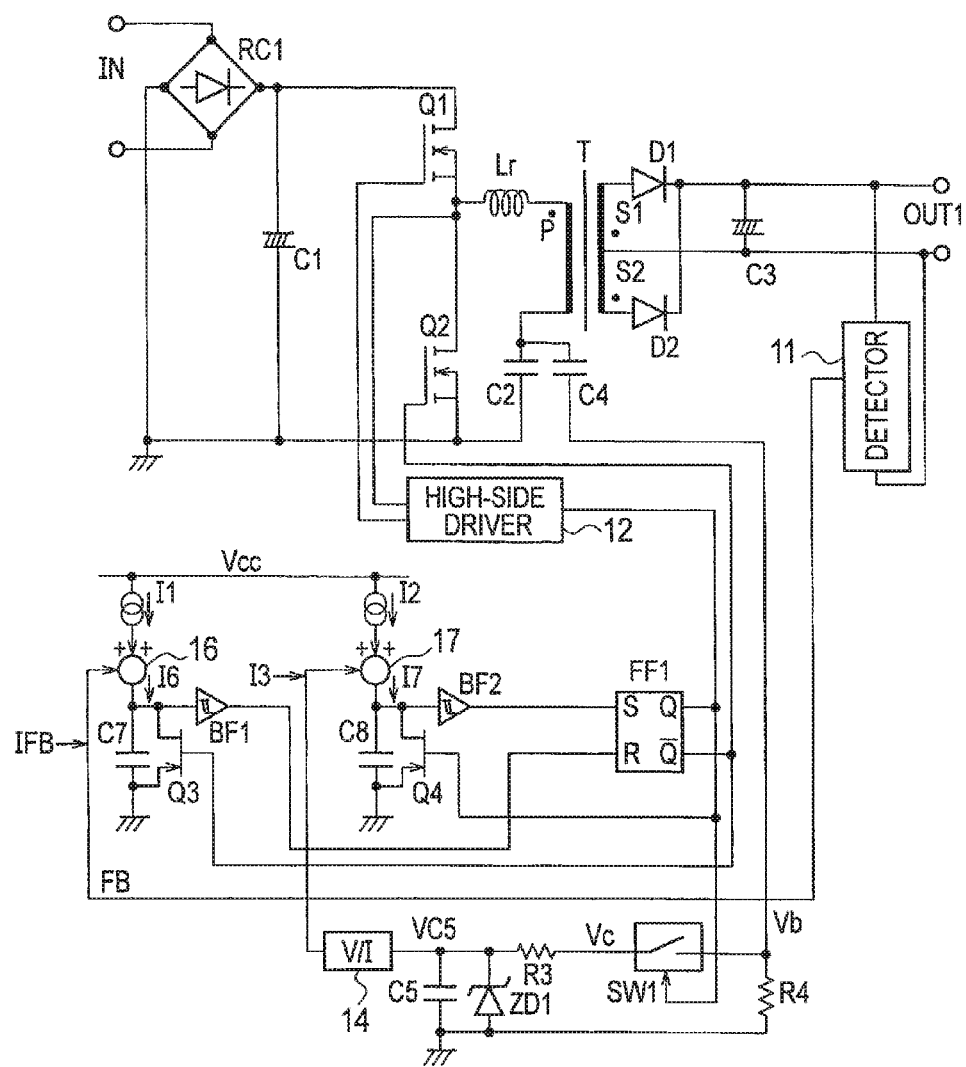
FIG. 3 is a circuit diagram of a current resonance type power supply device according to Embodiment 1 of the present invention.

FIG. 3 is a circuit diagram of a current resonance type power supply device according to Embodiment 1 of the present invention. The current resonance type power supply device of Embodiment 1 illustrated in FIG. 3 includes a control circuit which sets a first ON time of a switch element Q1 and a second ON time of a switch element Q2 to the same predetermined time and alternately turns on and off the switch element Q1 and the switch element Q2. In other words, a duty ratio is set to 50%.

Incidentally, when the switch elements Q1, Q2 are ON or OFF, a period during which both the switch elements are simultaneously OFF, namely, what is called a dead time, is necessary; however, since the dead time has no influence on description of a form of control of the embodiment, description of the dead time will be omitted assuming that the dead time is separately set.

The control circuit acts as a circuit to set the first ON time of the switch element Q1 and includes a current source I1, an adder 16, a capacitor C7, a MOSFET Q3, a buffer BF1, and a flip-flop circuit FF1.

The control circuit acts as a circuit to set the second ON time of the switch element Q2 and includes a current source I2, an adder 17, a capacitor C8, a MOSFET Q4, a buffer BF2, and the flip-flop circuit FF1.

Also, under light-load conditions where there is a large amount of feedback (or amount of FB) based on a DC (direct current) voltage detected by a detector 11, the adder 16 adds a current of the current source I1 and a larger feedback current IFB together thereby to produce a large current and thus make the first ON time of the switch element Q1 shorter than a predetermined time. The current source I1 and the adder 16 form a first ON time controller.

Incidentally, the switch element Q1 corresponds to a first switch element, and the switch element Q2 corresponds to a second switch element. Diodes D1, D2 and a smoothing capacitor C3 form a full-wave rectifier circuit which performs full-wave rectification and smoothing on a voltage generated in secondary windings S1, S2 of a transformer T thereby to extract a DC voltage.

Next, description will be given with regard to a configuration of connection of the control circuit. One end of the current source I1 is connected to a power supply Vcc, and the other end of the current source I1 is connected via the adder 16 to one end of the capacitor C7, a drain of the MOSFET Q3 and an input end of the buffer BF1. The other end of the capacitor C7 and a source of the MOSFET Q3 are grounded. A gate of the MOSFET Q3 is connected to an inverting output terminal Qb of the flip-flop circuit FF1 and a gate of the switch element Q2 on a low side. An output terminal of the buffer BF1 is connected to a reset terminal R of the flip-flop circuit FF1.

The adder 16 adds together the current of the current source I1 and the feedback current IFB according to the amount of feedback FB detected by the detector 11 and charges the capacitor C7 with the added current.

One end of the current source I2 is connected to the power supply Vcc, and the other end of the current source I2 is connected via the adder 17 to one end of the capacitor C8, a drain of the MOSFET Q4 and an input end of the buffer BF2. The other end of the capacitor C8 and a source of MOSFET Q4 are grounded. A gate of the MOSFET Q4 is connected to an output terminal Q of the flip-flop circuit FF1 and a high-side driver 12. An output terminal of the buffer BF2 is connected to a set terminal S of the flip-flop circuit FF1.

Also, the current resonance type power supply device is characterized by including a second ON time controller having capacitors C4, C5, resistors R3, R4, a switch SW1, a Zener diode ZD1, and a V/I (voltage-current converter) 14.

The second ON time controller sets the second ON time of the switch element Q2 longer than a predetermined time, based on an average value of current detected by the capacitor C4, when an average current value of the switch element Q1 is small, or equivalently, under light-load conditions, and the second ON time controller sets the second ON time of the switch element Q2 to the predetermined time, when the average current value of the switch element Q1 is large, or equivalently, under heavy-load conditions.

One end of the capacitor C4 is connected to one end of the primary winding P of the transformer T and one end of the capacitor C2, and forms a current detector configured to detect a current flowing through the primary winding P of the transformer T. One end of the resistor R9 and one end of the switch SW1 are connected to the other end of the capacitor C4, and the other end of the resistor R4 is grounded.

The other end of the switch SW1 is connected to one end of the resistor R3, the other end of the resistor R3 is connected to one end of the capacitor C5 and an input terminal of the V/I 14, and the other end of the capacitor C5 is grounded. The Zener diode ZD1 is connected across ends of the capacitor C5. The Zener diode ZD1 for clamping a voltage is provided in order to set the duty ratio of the switch elements Q1, Q2 to 50% as an initial value. An output terminal of the V/I 14 is connected to the adder 17.

The switch SW1 is turned on when the switch SW1 receives input of a high level from the output terminal Q of the flip-flop circuit FF1. The adder 17 adds a current from the current source I2 and a current I3 from the V/I 14 together and charges the capacitor C8 with the added current.

Figure 4:
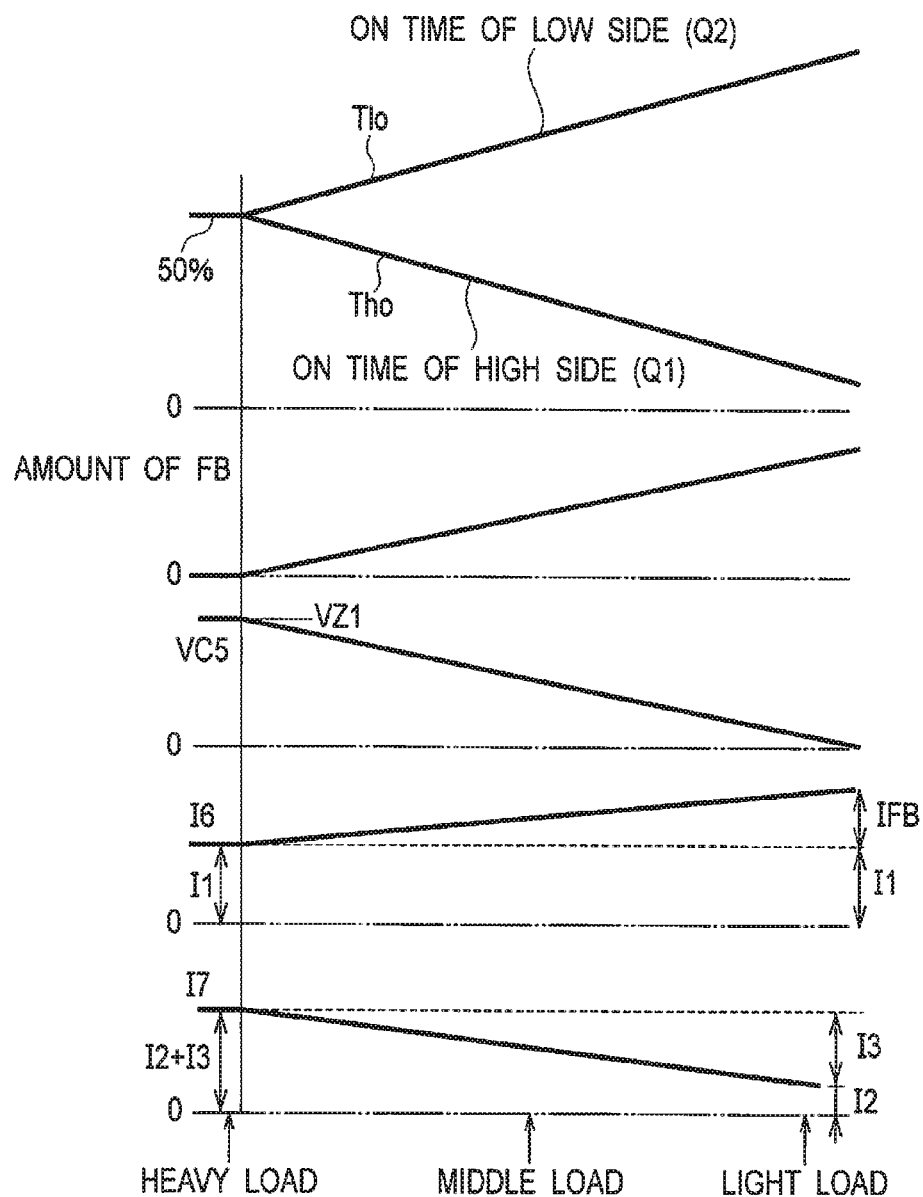
FIG. 4 is a graph illustrating changes in the ON time of a low-side switch element and the ON time of a high-side switch element, the amount of feedback, and the like of the current resonance type power supply device according to Embodiment 1 of the present invention under heavy load, under middle load and under light load.

Next, description will be given with reference to FIGS. 3 to 5 with regard to operation of the current resonance type power supply device of Embodiment 1 thus configured. FIG. 4 is a graph illustrating changes in the ON time of the low-side switch element Q2 and the ON time of the high-side switch element Q1, the amount of feedback (FB), a voltage VC5 of the capacitor C5, a current IC7 of the capacitor C7 and a current IC8 of the capacitor C8 of the current resonance type power supply device according to Embodiment 1 of the present invention under heavy load, under middle load and under light load.

Figure 5:
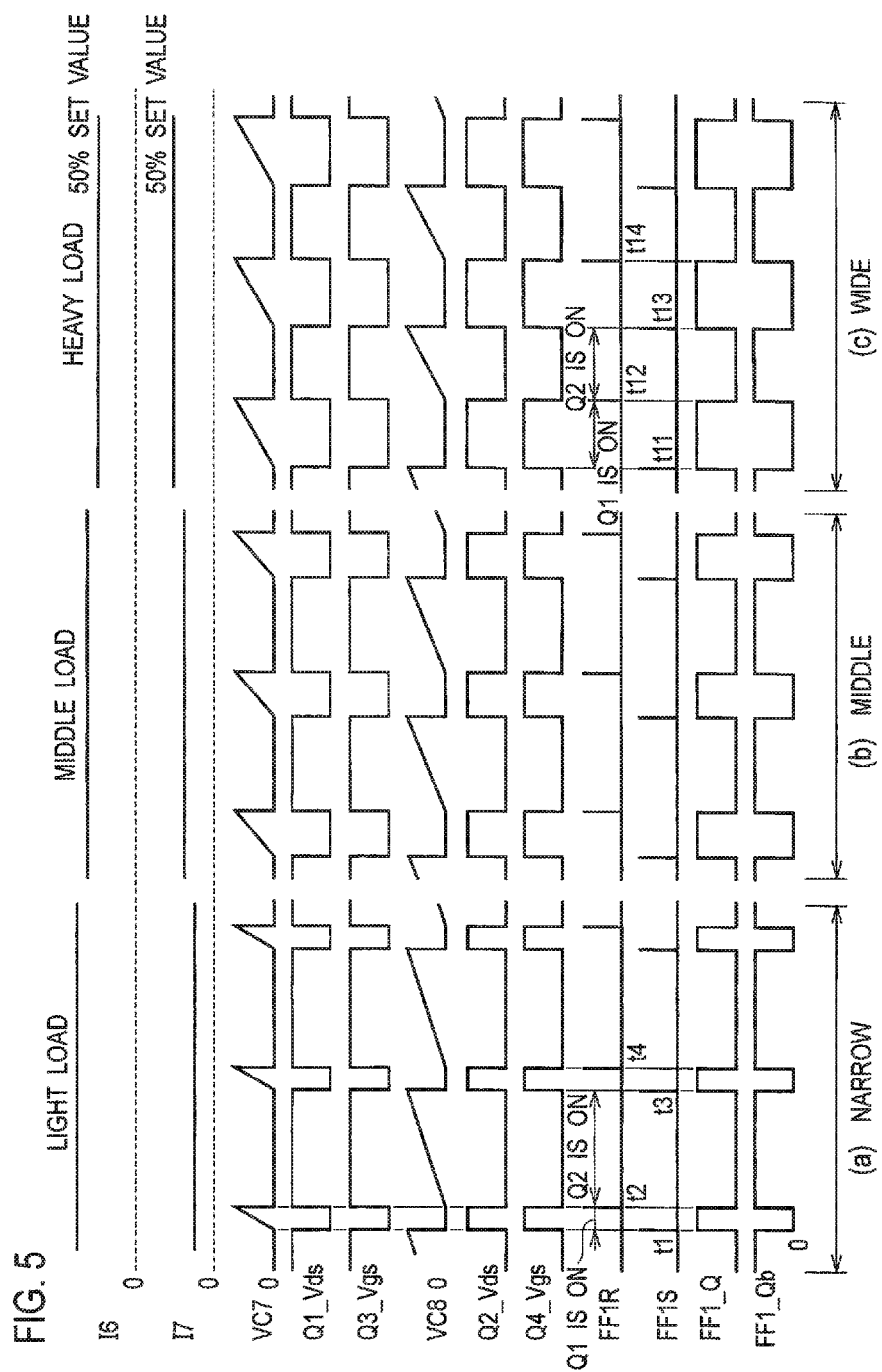
FIG. 5 is a timing chart of assistance in explaining operations of portions of the current resonance type power supply device according to Embodiment 1 of the present invention under heavy load, under middle load and under light load.

FIG. 5 is a timing chart of assistance in explaining operations of portions of the current resonance type power supply device according to Embodiment 1 of the present invention under heavy load (see Part (c) of FIG. 5), under middle load (see Part (b) of FIG. 5) and under light load (see Part (a) of FIG. 5).

In FIG. 5, 16 represents the current of the current source I1 plus the current IFB; 17, the current of the current source I2 plus the current I3; VC7, a voltage of the capacitor C7; Q1Vds, a drain-source voltage of the switch element Q1; Q3Vgs, a gate-source voltage of the MOSFET Q3; VC8, a voltage of the capacitor C8; Q2Vds, a drain-source voltage of the switch element Q2; Q4Vgs, a gate-source voltage of the MOSFET Q4; and FF1R, FF1S, FF1Q and FF1Qb, signals of the reset terminal R, the set terminal S, the output terminal Q and the inverting output terminal Qb, respectively, of the flip-flop circuit FF1.

Firstly, description will be given with regard to operation under heavy-load conditions illustrated in Part (c) of FIG. 5. First, it is assumed that the capacitor C8 is in a charged state. In this case, for example at time t11, the buffer BF2 outputs a high level to the set terminal S of the flip-flop circuit FF1, and thus, the output terminal Q of the flip-flop circuit FF1 outputs the high level to the high-side driver 12. Thus, the switch element Q1 is turned on.

At this time, the output terminal Q of the flip-flop circuit FF1 outputs the high level to the gate of the MOSFET Q4, and thus, the MOSFET Q4 is turned on. Thus, an electric charge of the capacitor C8 is discharged. Also, the inverting output terminal Qb of the flip-flop circuit FF1 outputs a low level to the gate of the MOSFET Q3, and thus, the MOSFET Q3 is turned off.

Then, during a period of time between the time t11 and time t12, when the current of the current source I1 and the feedback current IFB added together by the adder 16 flows through the capacitor C7, the capacitor C7 is charged and its voltage rises.

At the time t12, when the voltage of the capacitor C7 exceeds a predetermined value, the buffer BF1 outputs a high level to the reset terminal R of the flip-flop circuit FF1, and thus, the inverting output terminal Qb of the flip-flop circuit FF1 outputs the high level to the gate of the switch element Q2. Thus, the switch element Q2 is turned on. Also, the output terminal Qb of the flip-flop circuit FF1 outputs the high level to the gate of the MOSFET Q3, and thus, the MOSFET Q3 is turned on. Thus, the capacitor C7 is discharged.

Also, the output terminal Q of the flip-flop circuit FF1 outputs a low level to the gate of the MOSFET Q4, and thus, the MOSFET Q4 is turned off. Thus, as described later, during a period of time between the time t12 and time t13, a voltage of the capacitor C8 rises.

Also, at the time t12, the output terminal Q of the flip-flop circuit FF1 outputs the low level to the high-side driver 12, and thus, the switch element Q1 is turned off. In other words, the period of time between the time t11 and the time t12 is the ON time of the switch element Q1.

Under heavy-load conditions, as illustrated in FIG. 4, the amount of feedback is small, and thus, the feedback current IFB is also small, so that a charging time required for the voltage of the capacitor C7 to reach the predetermined value (or the period of time between the time t11 and the time t12) becomes longer.

Meanwhile, under light-load conditions, as illustrated in FIG. 4, the amount of feedback is large, and thus, the feedback current IFB is also large, so that the charging time required for the voltage of the capacitor C7 to reach the predetermined value (or the period of time between time t1 and time t2) becomes shorter. Thus, as illustrated in FIG. 5, the ON time of the switch element Q1 is long under heavy-load conditions and is short under light-load conditions.

Meanwhile, the following operation is performed on the current source I2 side. First, when the switch element Q1 is ON (or during the period of time between the time t11 and the time t12), a current flows through the primary winding P of the transformer T via the switch element Q1, and thus, the capacitor C4 and the capacitor C2 shunt the current flowing through the primary winding P of the transformer T at a capacitance ratio, and output the shunted current to the resistor R4.

Also, when the switch element Q1 is ON, the output terminal Q of the flip-flop circuit FF1 outputs a high level, and thus, the switch SW1 is turned on. Thus, a voltage generated in the resistor R4 is integrated by an integrating circuit of the resistor R3 and the capacitor C5, and the capacitor C5 obtains an average value of current. As illustrated in FIG. 4, the voltage VC5 of the capacitor C5 is small under light-load conditions and is large under heavy-load conditions.

Further, the V/I 14 converts the voltage of the capacitor C5 into a current and inputs the converted current to the adder 17. During a period of time between the time t12 and time t13, the adder 17 adds the current I3 from the V/I 14 and the current from the current source I2 and together and charges the capacitor C8 with the added current. Then, the voltage of the capacitor C8 rises.

At the time t13, when the voltage of the capacitor C8 exceeds a predetermined value, the output of the buffer BF2 outputs a high level to the set terminal S of the flip-flop circuit FF1, and thus, the output terminal Q of the flip-flop circuit FF1 outputs the high level to the high-side driver 12, so that the switch element Q1 is turned on. Also, the output terminal Q of the flip-flop circuit FF1 outputs the high level to the gate of the MOSFET Q4, and thus, the MOSFET Q4 is turned on. Thus, the capacitor C8 is discharged.

The inverting output terminal Qb of the flip-flop circuit FF1 outputs a low level to the gate of the MOSFET Q3, and thus, the MOSFET Q3 is turned off. At this time, the inverting output terminal Qb of the flip-flop circuit FF1 outputs the low level to the switch element Q2, and thus, the switch element Q2 is turned off. In other words, the period of time between the time t12 and the time t13 is the ON time of the switch element Q2.

Under heavy-load conditions, as illustrated in FIG. 4, the current I3 is large, and thus, a charging time required for the voltage of the capacitor C8 to reach the predetermined value (or the period of time between the time t12 and the time t13) becomes shorter.

Meanwhile, under light-load conditions, as illustrated in FIG. 4, the current I3 is small, and thus, the charging time required for the voltage of the capacitor C8 to reach the predetermined value (or the period of time between time t2 and time t3) becomes longer. Thus, the ON time of the switch element Q2 is short under heavy-load conditions as illustrated in Part (c) of FIG. 5, and the ON time of the switch element Q2 is long under light-load conditions as illustrated in Part (a) of FIG. 5.

Figure 8:
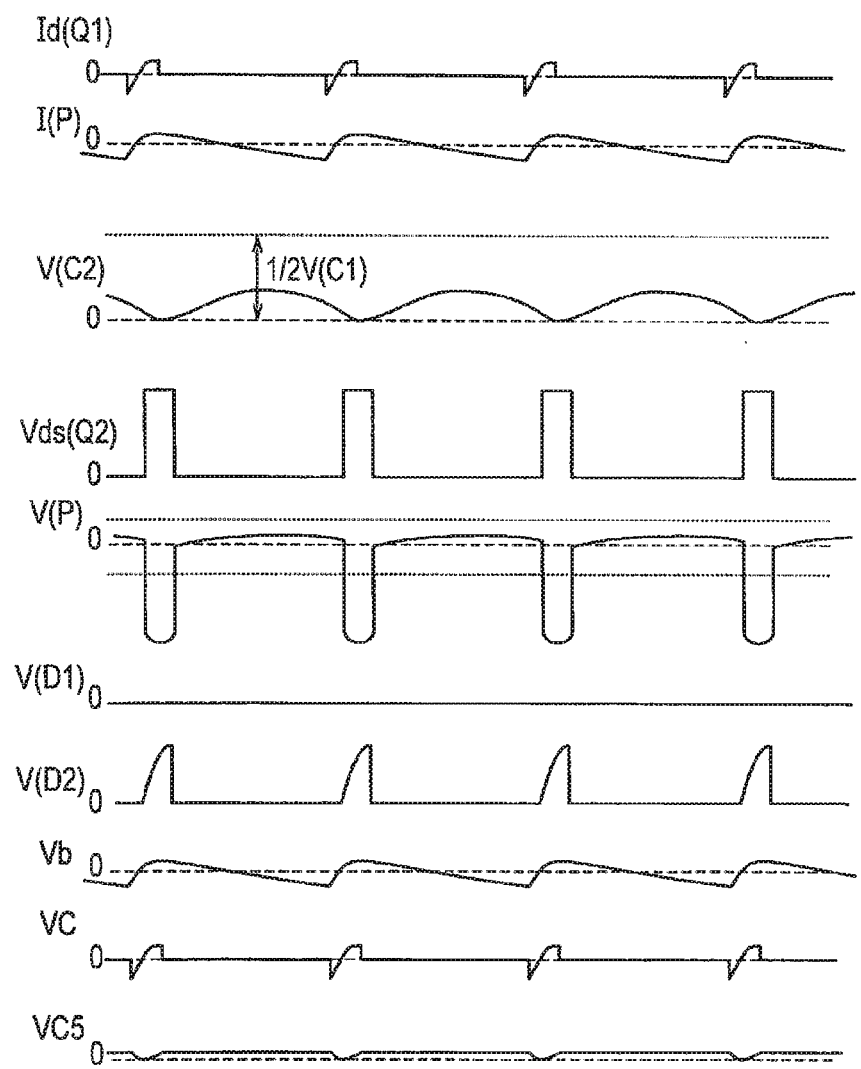
FIG. 8 is a chart illustrating waveforms of the portions of the current resonance type power supply device according to Embodiment 1 of the present invention under light load.

Therefore, under light-load conditions, as illustrated in FIG. 8, the voltage V(C2) of the current resonance capacitor C2 varies to increase or decrease at a lower voltage than ½ of the voltage V(C1). In other words, under light-load conditions, the ON/OFF time of the switch element Q1 and the switch element Q2 is made variable to change the duty ratio from 50% and thereby enable reducing the charging/discharging current and loss of the current resonance capacitor C2 and hence improving the efficiency.

Thus, according to the current resonance type power supply device of Embodiment 1, as illustrated in FIG. 4, an ON time Tho of the switch element Q1 on the high side becomes shorter than a predetermined time (or time at a duty ratio of 50%) under light-load conditions. Thus, the current resonance capacitor C2 is charged or discharged about a lower voltage than that of the smoothing capacitor C1, and thereby, a sufficient voltage can be applied to the primary winding P even though the charging/discharging current is small.

Figure 6:
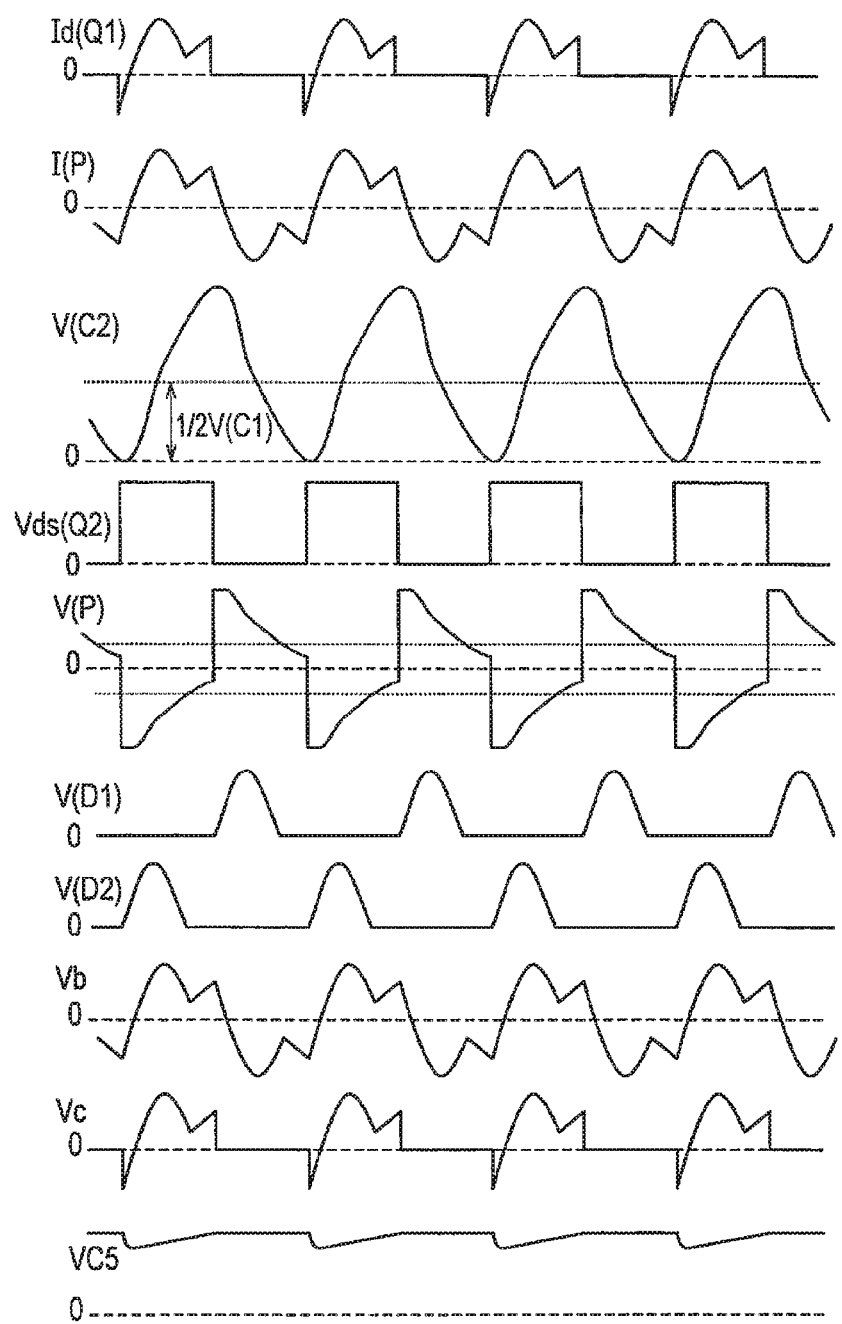
FIG. 6 is a chart illustrating waveforms of the portions of the current resonance type power supply device according to Embodiment 1 of the present invention under heavy load.
Figure 7:
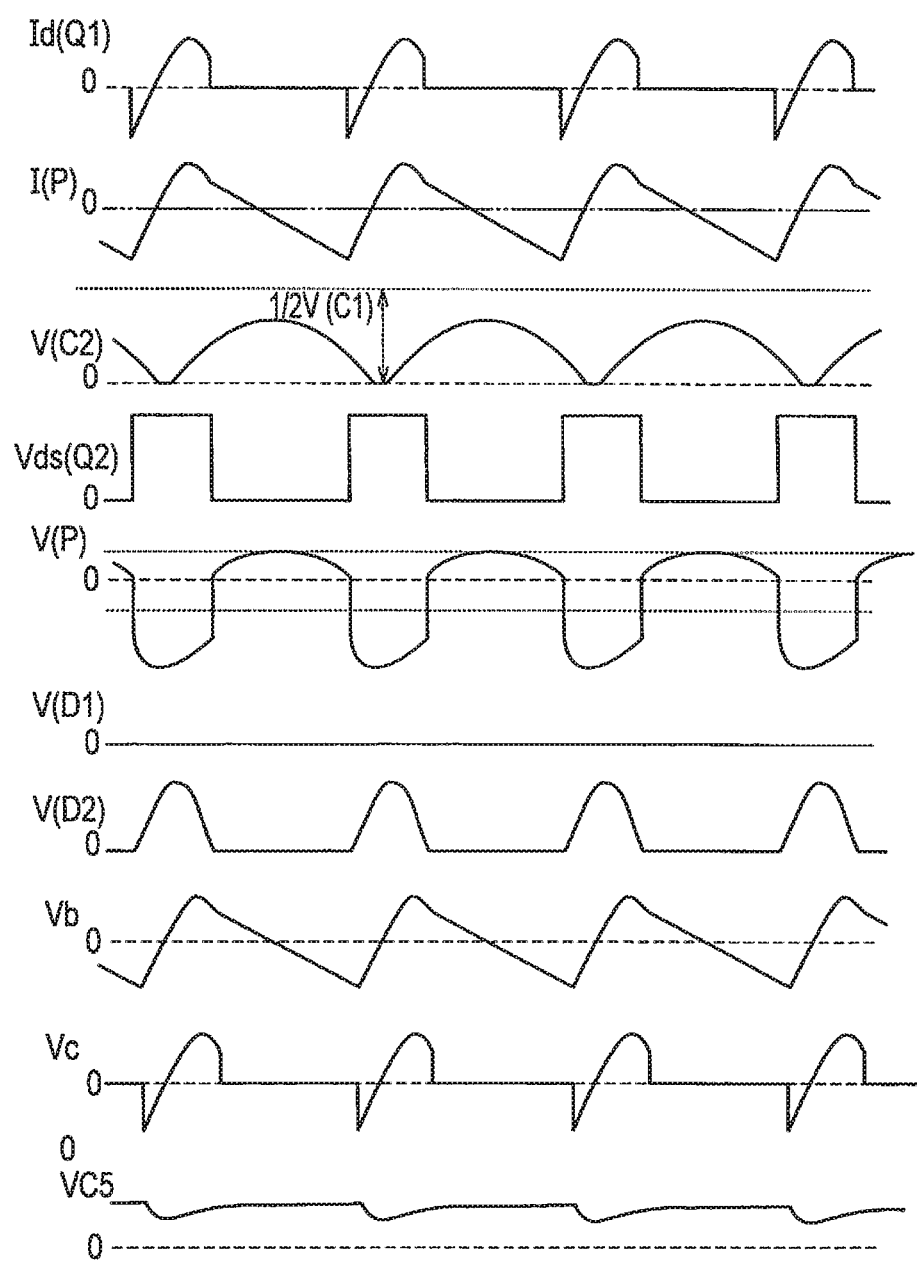
FIG. 7 is a chart illustrating waveforms of the portions of the current resonance type power supply device according to Embodiment 1 of the present invention under middle load.

Incidentally, FIG. 6 illustrates waveforms of the portions of the current resonance type power supply device of Embodiment 1 under heavy load. FIG. 7 illustrates waveforms of the portions of the current resonance type power supply device of Embodiment 1 under middle load. FIG. 8 illustrates waveforms of the portions of the current resonance type power supply device of Embodiment 1 under light load. In FIGS. 6 to 8, Vb represents a voltage of the resistor R4; and Vc, a voltage of the resistor R3.

Embodiment 2

Figure 9:
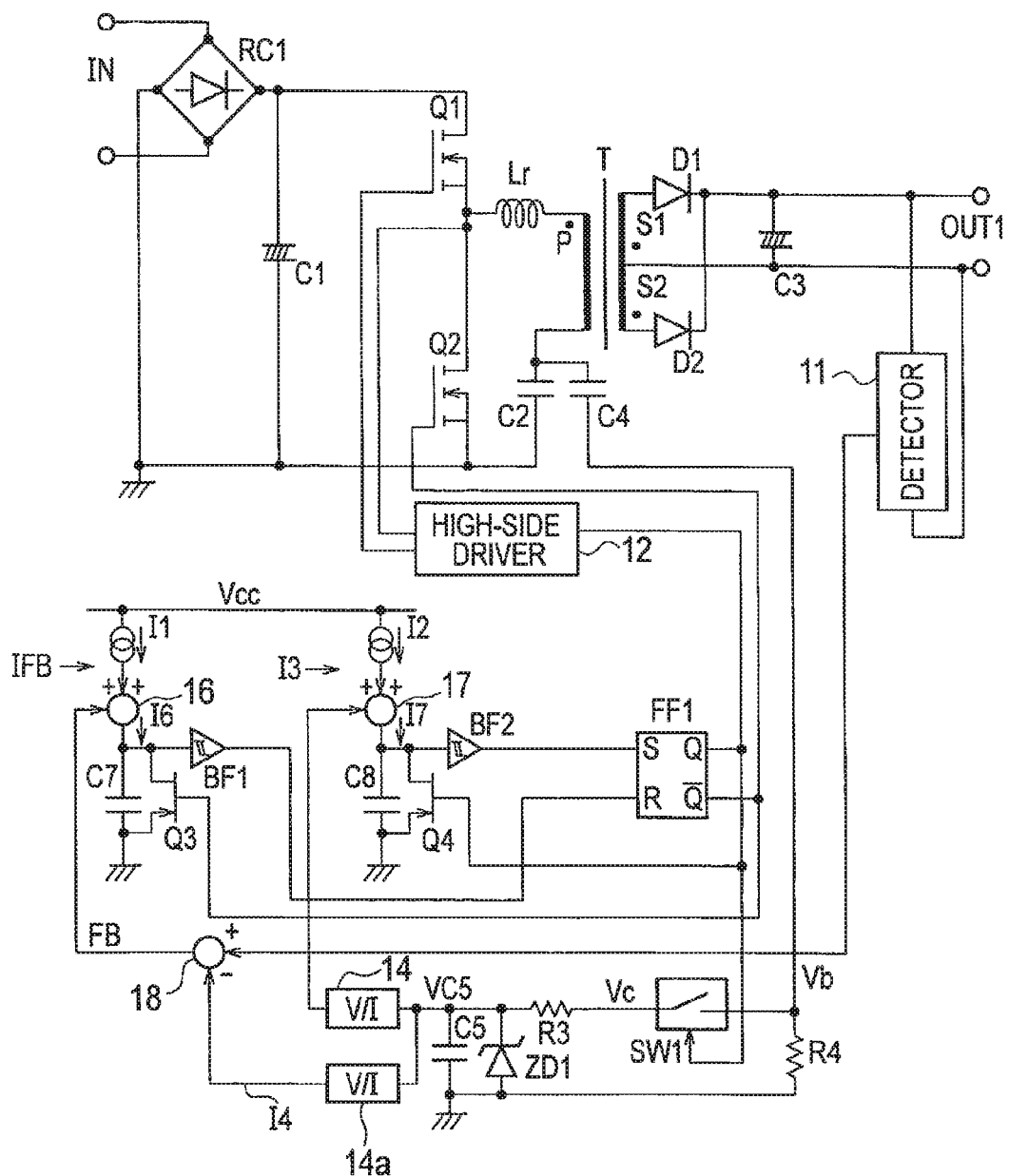
FIG. 9 is a circuit diagram of a current resonance type power supply device according to Embodiment 2 of the present invention.

FIG. 9 is a circuit diagram of a current resonance type power supply device according to Embodiment 2 of the present invention. The current resonance type power supply device according to Embodiment 2 of the present invention illustrated in FIG. 9 is characterized by further including a V/I 14a and an adder 18 in addition to the configuration of the current resonance type power supply device of Embodiment 1 illustrated in FIG. 3. The capacitors C4, C5, the resistors R3, R4, the switch SW1, the Zener diode ZD1, the V/I 14a and the adder 18 form a third ON time controller.

The V/I 14a converts the voltage of the capacitor C5 into a current and outputs the converted current to the adder 18. The adder 18 outputs the feedback current IFB obtained by subtracting a current I4 from the V/I 14a from the amount of FB from the detector 11, to the adder 16. The adder 16 adds together the subtracted feedback current IFB from the adder 18 and the current of the current source I1 and charges the capacitor C7 with the added current.

Figure 10:
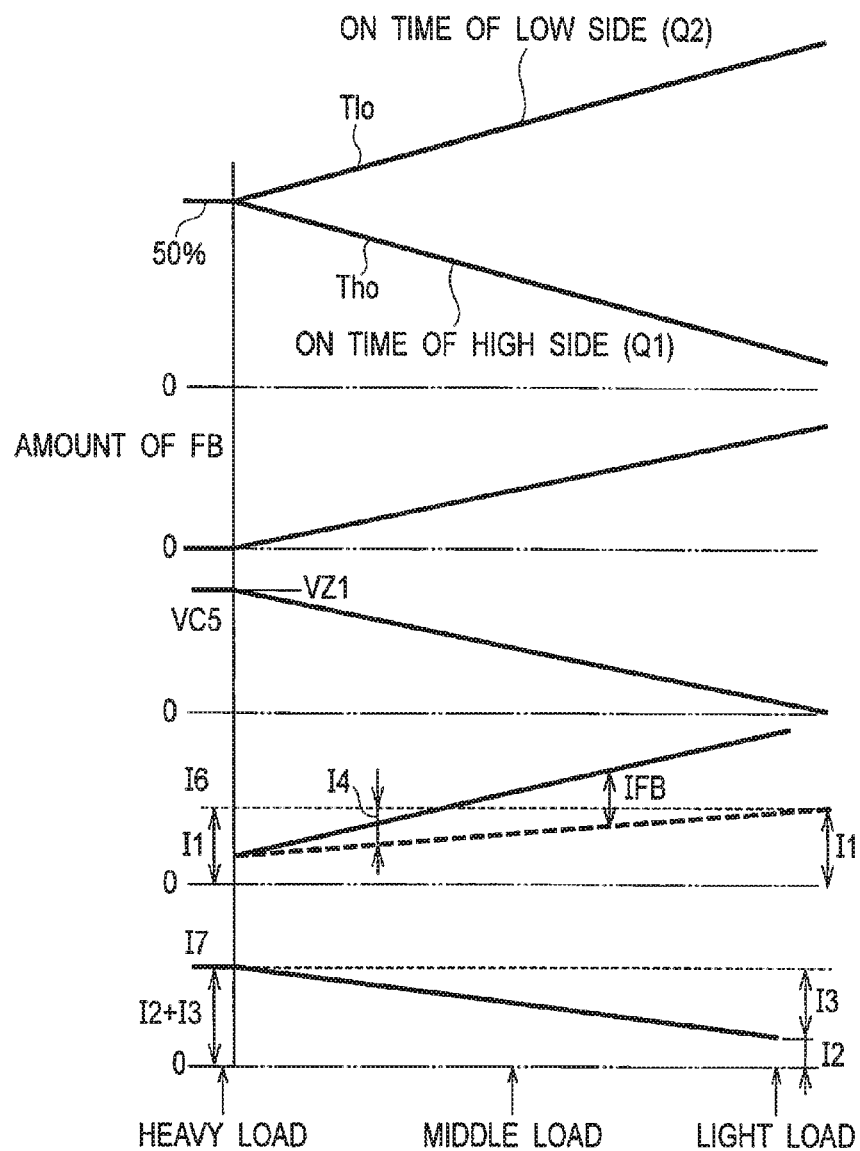
FIG. 10 is a graph illustrating changes in the ON time of a low-side switch element and the ON time of a high-side switch element, the amount of feedback, and the like of the current resonance type power supply device according to Embodiment 2 of the present invention under heavy load, under middle load and under light load.

Under heavy-load conditions, as illustrated in FIG. 10, the amount of FB is zero, and thus, the current flowing through the capacitor C7 has a value obtained by subtracting the current I4 from the current I1. As a load condition changes from a middle-load condition to a light-load condition, the amount of FB becomes gradually larger and the current I4 from the V/I 14a becomes smaller, and thus, a change in the feedback current IFB becomes greater.

Thus, a change in the current I6 illustrated in FIG. 10 becomes greater than a change in the current I6 illustrated in FIG. 4. Therefore, the capacitor C7 is charged with a still larger current under light-load conditions, and thus, as illustrated in FIG. 10, the ON time of the switch element Q1 becomes still shorter than the ON time of the switch element Q1 of Embodiment 1. Therefore, the current resonance type power supply device of Embodiment 2 has its greater effect than the current resonance type power supply device of Embodiment 1.

Embodiment 3

Figure 11:
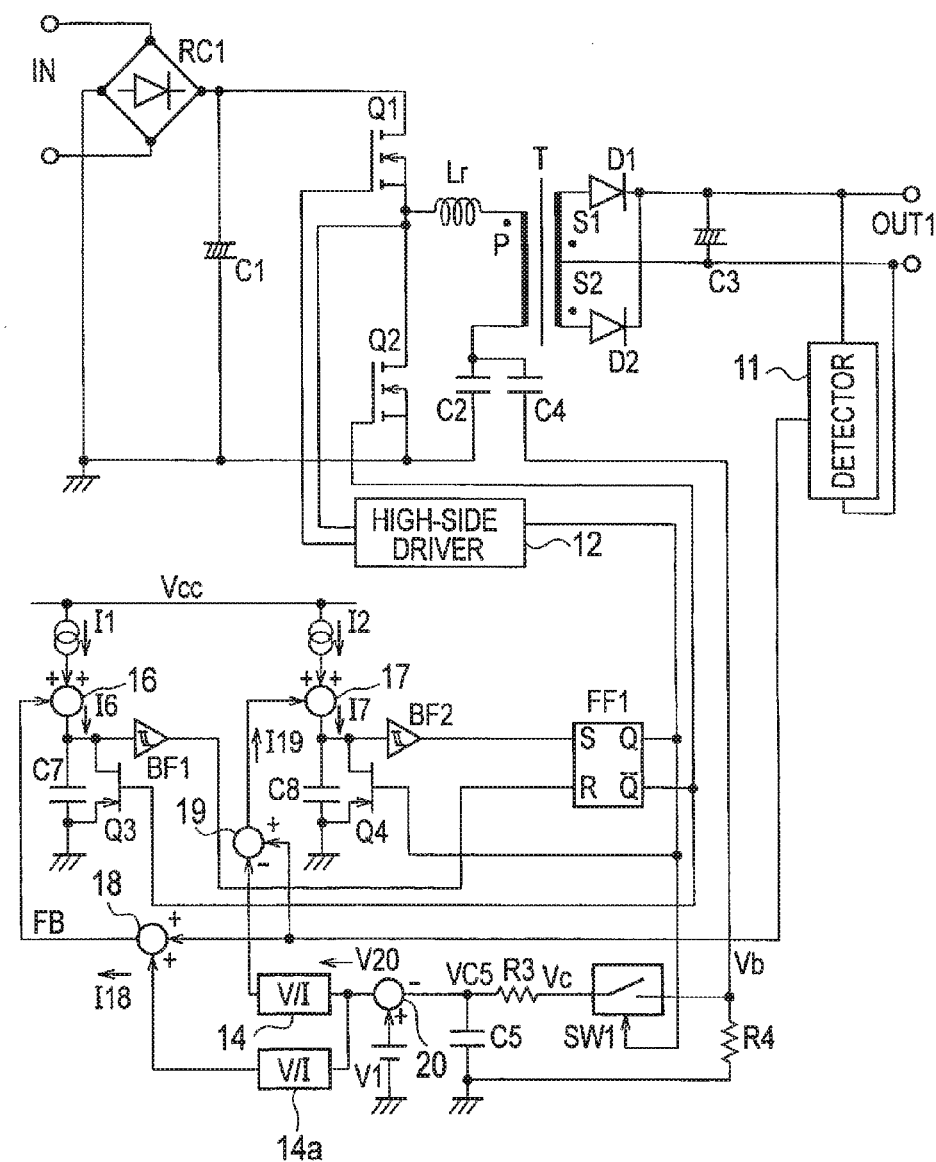
FIG. 11 is a circuit diagram of a current resonance type power supply device according to Embodiment 3 of the present invention.

FIG. 11 is a circuit diagram of a current resonance type power supply device according to Embodiment 3 of the present invention. The current resonance type power supply device according to Embodiment 3 of the present invention illustrated in FIG. 11 is characterized by further including a reference power supply V1 and adders 19, 20 in addition to the configuration of the current resonance type power supply device of Embodiment 2 illustrated in FIG. 9.

The reference power supply V1, the voltage VC5 of the capacitor C5, the adder 20 and the V/Is 14, 14a form a load condition setting unit configured to set a load condition for switching the duty ratio between the first ON time of the switch element Q1 and the second ON time of the switch element Q2 from 50% to anything other than 50%.

The current resonance type power supply device sets the second ON time of the switch element Q2 longer than a predetermined time, as the load condition changes from a load condition set by the load condition setting unit to a light-load condition. The third ON time controller is characterized by including a fourth ON time controller which sets the first ON time of the switch element Q1 shorter than a predetermined time, as the load condition changes from the load condition set by the load condition setting unit to the light-load condition.

The adder 20 subtracts the voltage of the capacitor C5 from a voltage of the reference power supply V1 and outputs a subtracted output to the V/Is 14, 14a. The V/Is 14, 14a convert the voltage into a current and output the current, when the voltage of the reference power supply V1 exceeds the voltage of the capacitor C5, or equivalently, when the subtracted output is a positive voltage.

The adder 19 subtracts the V/I 14 from the amount of FB and outputs a subtracted current as a current I19 to the adder 17. The adder 17 adds the current I19 from the adder 19 and the current from the current source I2 together and charges the capacitor C8 with the added current.

The adder 18 adds the current from the V/I 14a and the amount of FB together and outputs the added current as I18 to the adder 16. The adder 16 adds the current I18 from the adder 18 and the current of the current source I1 together and charges the capacitor C7 with the added current.

Figure 12:
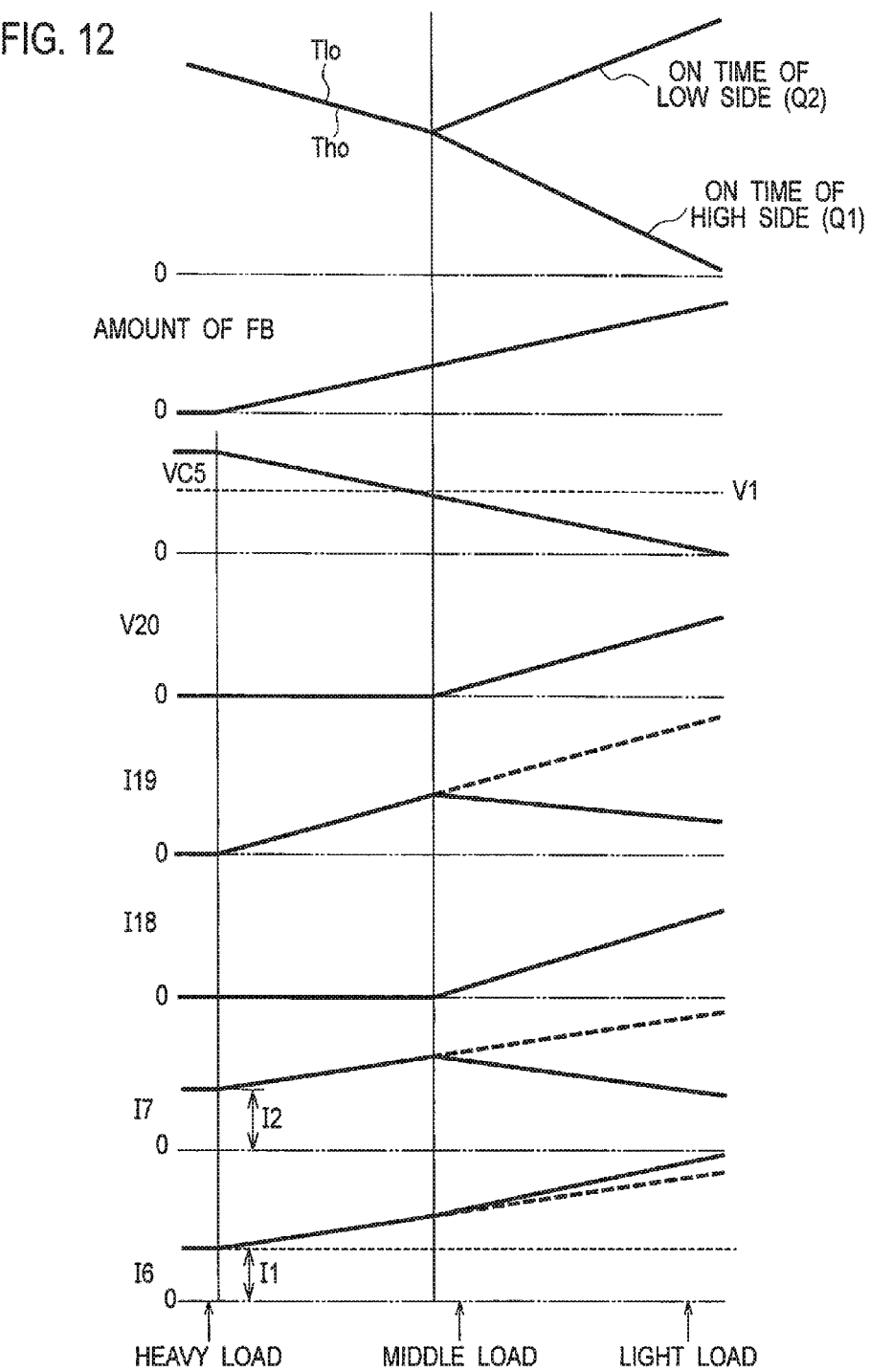
FIG. 12 is a graph illustrating changes in the ON time of a low-side switch element and the ON time of a high-side switch element, the amount of feedback, and the like of the current resonance type power supply device according to Embodiment 3 of the present invention under heavy load, under middle load and under light load.

Next, description will be given with regard to operation of the current resonance type power supply device of Embodiment 3 thus configured. FIG. 12 illustrates changes in the ON time of a low-side switch element and the ON time of a high-side switch element, the amount of FB, the currents I18, I19, a voltage V20 and the charging currents I6, I7 of the capacitors C7, C8 of the current resonance type power supply device according to Embodiment 3 of the present invention under heavy load, under middle load and under light load.

First, as illustrated in FIG. 12, the voltage of the reference power supply V1 is set to a load condition of about middle load. When the voltage VC5 of the capacitor C5 is equal to or more than the voltage of the reference power supply V1, the V/Is 14, 14a do not operate. Thus, under heavy-load through about middle-load conditions, the V/Is 14, 14a do not output currents to the adders 18, 19. Therefore, the ON time of the switch element Q1 and the ON time of the switch element Q2 are determined under control only based on the normal amount of FB. At this time, operation is performed at a duty ratio of 50%.

Meanwhile, as the load condition changes from a middle-load condition to a light-load condition, the voltage VC5 decreases and thus a subtracted result of the voltage V20 becomes positive, and thus, the currents from the V/Is 14, 14a are outputted to the adders 18, 19, so that the currents from the V/Is 14, 14a are added to the normal amount of FB. Thus, the currents I6, I7 as illustrated in FIG. 10 flow through the capacitors C7, C8. Thus, the same operation as Embodiment 2 is performed under middle-load through light-load conditions.

Thus, according to the current resonance type power supply device of Embodiment 3, the reference power supply V1, the voltage VC5 of the capacitor C5 and the V/Is 14, 14a set the load condition for switching the duty ratio between the first ON time of the switch element Q1 and the second ON time of the switch element Q2 from 50% to anything other than 50%. In this embodiment, the voltage of the reference power supply V1 is set to a load condition of about middle load, and, when the voltage of the reference power supply V1 exceeds the voltage VC5 of the capacitor C5, the V/Is 14, 14a are operated to enable switching the duty ratio from 50% to anything other than 50%.

In other words, the load condition for switching the duty ratio from 50% to anything other than 50% can be set to any optimum one of heavy load, middle load and light load, and thus, the efficiency of the current resonance type power supply device can be improved.

Incidentally, the setting of a load condition for switching the duty ratio from anything other than 50% to 50% is the same as the setting of the load condition for switching the duty ratio from 50% to anything other than 50%.

Embodiment 4

Figure 1:
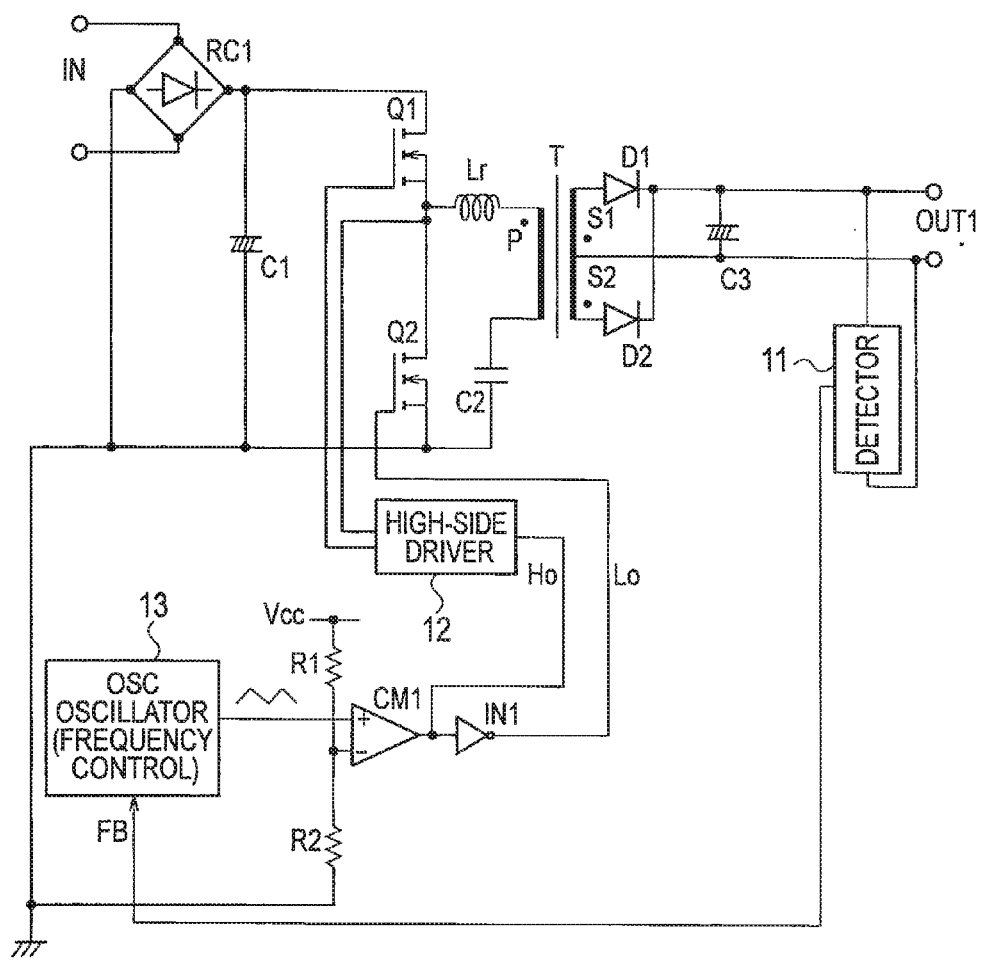
FIG. 1 is a circuit diagram illustrating a conventional current resonance type power supply device.
Figure 2:
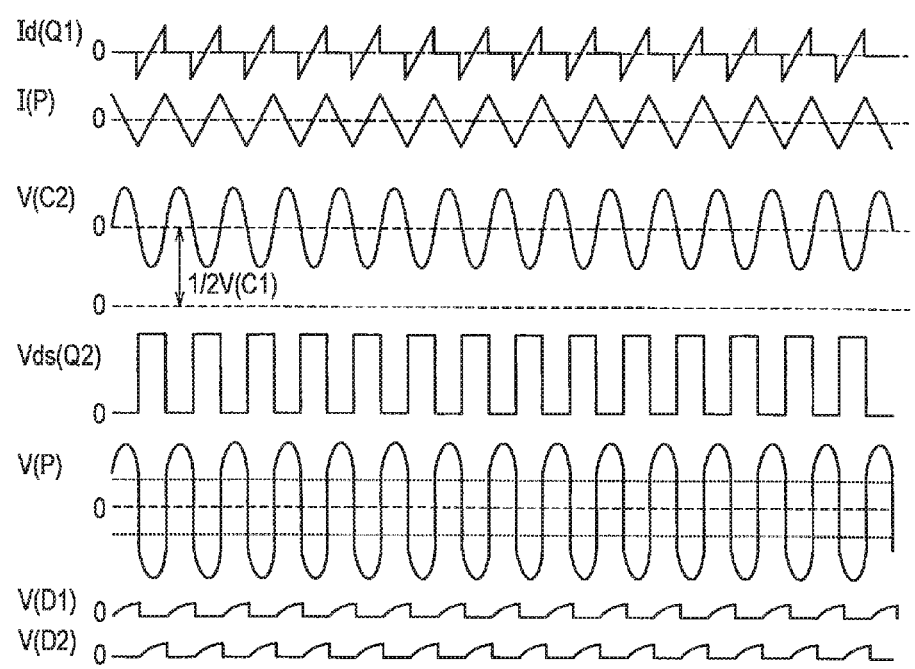
FIG. 2 is a chart illustrating waveforms of portions of the conventional current resonance type power supply device under light load.
Figure 13:
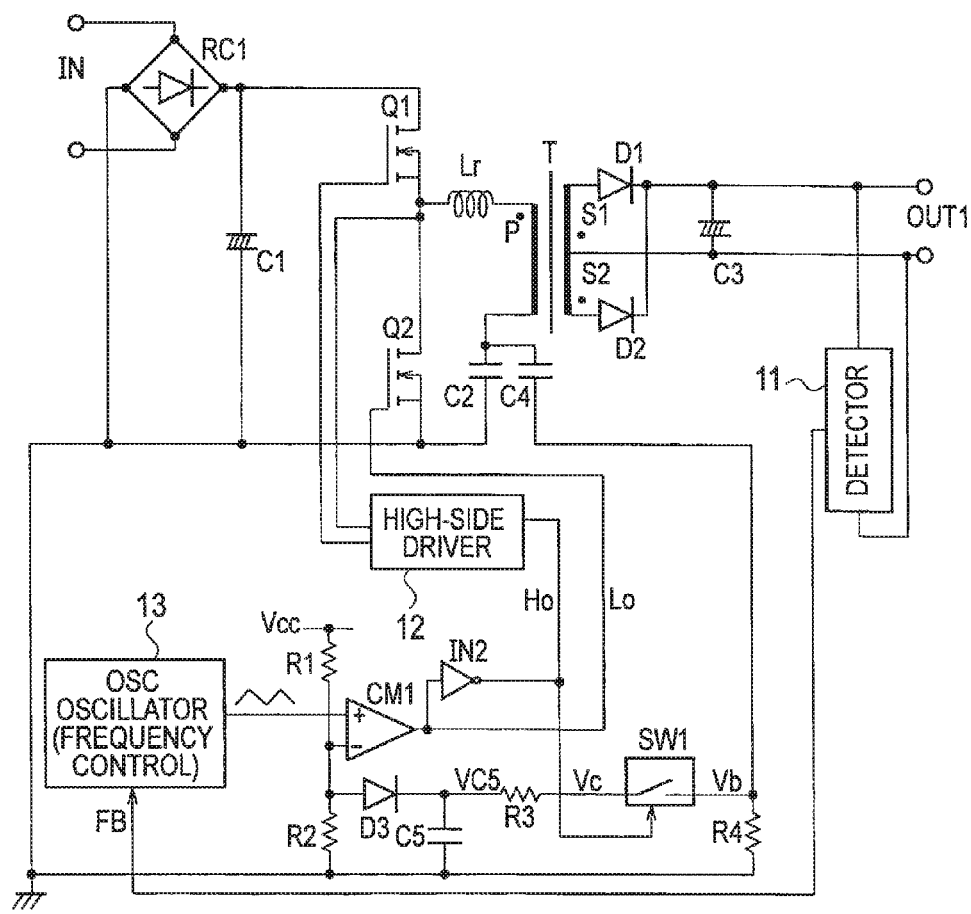
FIG. 13 is a circuit diagram of a current resonance type power supply device according to Embodiment 4 of the present invention.

FIG. 13 is a circuit diagram of a current resonance type power supply device according to Embodiment 4 of the present invention. The current resonance type power supply device according to Embodiment 4 of the present invention illustrated in FIG. 13 is characterized by including a fifth ON time controller including the capacitors C4, C5, the resistors R3, R4, the switch SW1, and a diode D3, in addition to the configuration of the conventional current resonance type power supply device illustrated in FIG. 1.

The fifth ON time controller sets one of the first ON time of the switch element Q1 and the second ON time of the switch element Q2, shorter than a predetermined time, and sets the other of the first ON time and the second ON time longer than the predetermined time, under light-load conditions, based on a value of current detected by the capacitor C4.

A configuration of connection of the capacitors C4, C5, the resistors R3, R4 and the switch SW1 is the same as the configuration of connection thereof illustrated in FIG. 3, and thus, description of the configuration of connection will be omitted.

A cathode of the diode D3 is connected to one end of the capacitor C5, and an anode of the diode D3 is connected to one end of the resistor R2, one end of the resistor R1 and an inverting input terminal of the comparator CM1. An input terminal of an inverter IN2 is connected to an output terminal of the comparator CM1, and the gate of the switch element Q2 is also connected to the output terminal of the comparator CM1. An output terminal of the inverter IN2 is connected to the high-side driver 12 and is connected to a gate of the switch element Q1.

Figure 14:
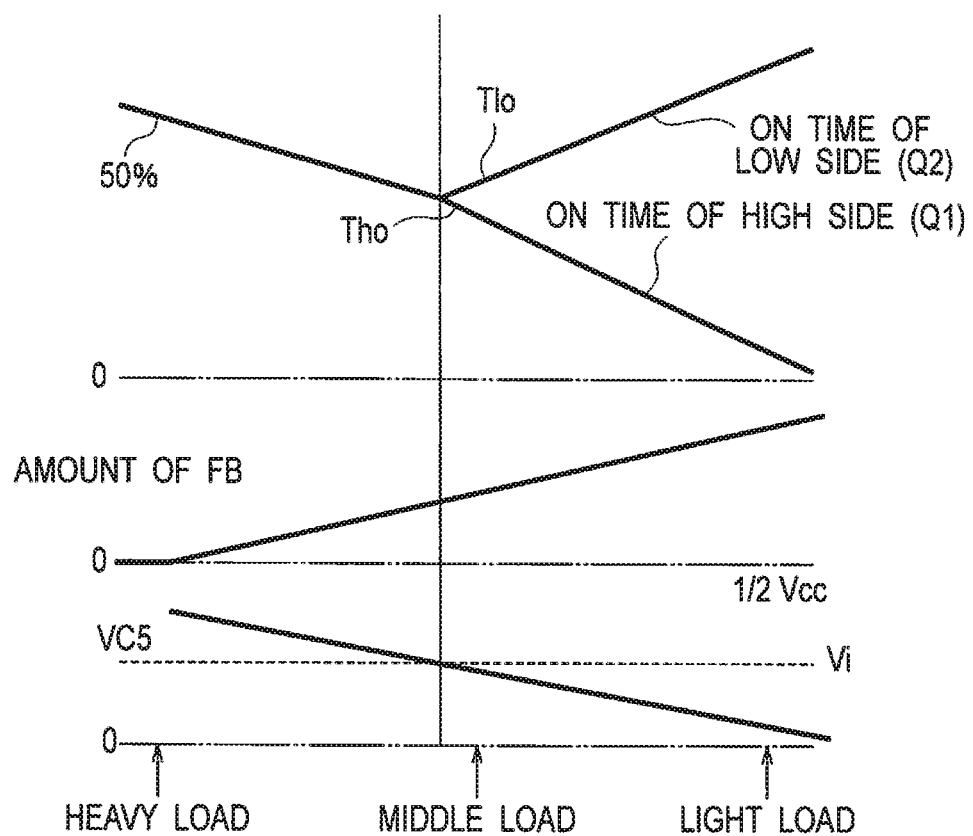
FIG. 14 is a graph illustrating changes in the ON time of a low-side switch element and the ON time of a high-side switch element, the amount of feedback, and the like of the current resonance type power supply device according to Embodiment 4 of the present invention under heavy load, under middle load and under light load.

Next, detailed description will be given with reference to FIGS. 13 and 14 with regard to operation of the current resonance type power supply device of Embodiment 4 thus configured.

First, when the switch element Q1 is ON, a current flows through the primary winding P of the transformer T via the switch element Q1, and thus, the capacitor C4 shunts the current flowing through the primary winding P of the transformer T at a capacitance ratio between the capacitors C2, C4, and output the shunted current to the resistor R4.

Also, when the switch element Q1 is ON, the inverter IN2 outputs a high level, and thus, the switch SW1 is turned on. Thus, a voltage generated in the resistor R9 is integrated by an integrating circuit of the resistor R3 and the capacitor C5, and the capacitor C5 obtains an average value of current across its ends. The average value of current is small under light-load conditions and is large under heavy-load conditions.

Thus, under light-load conditions, a reference voltage at a junction of the resistor R1 and the resistor R2 is lower than a reference voltage under heavy-load conditions. When a triangular wave signal from the oscillator 13 is equal to or more than the reference voltage, the comparator CM1 outputs a high level to the switch element Q2 to turn on the switch element Q2; meanwhile, when the triangular wave signal is less than the reference voltage, the comparator CM1 outputs a low level to the switch element Q2 to turn off the switch element Q2. Under light-load conditions, the reference voltage is lower than the reference voltage under heavy-load conditions, and thus, a high level period becomes long, so that an ON time Tlo of the switch element Q2 becomes long.

Meanwhile, the inverter IN2 inverts the output from the comparator CM1, and, when the triangular wave signal from the oscillator 13 is less than the reference voltage, the inverter IN2 outputs a high level to the switch element Q1 to turn on the switch element Q1; meanwhile, when the triangular wave signal is equal to or more than the reference voltage, the inverter IN2 outputs a low level to the switch element Q1 to turn off the switch element Q1. Thus, under light-load conditions, the reference voltage is lower than the reference voltage under heavy-load conditions, and thus, the high level period becomes short, so that the ON time Tho of the switch element Q1 becomes short as illustrated in FIG. 14.

Therefore, the current resonance type power supply device of Embodiment 4 can also achieve the same effect as that of the current resonance type power supply device of Embodiment 1.

Embodiment 5

Figure 15:
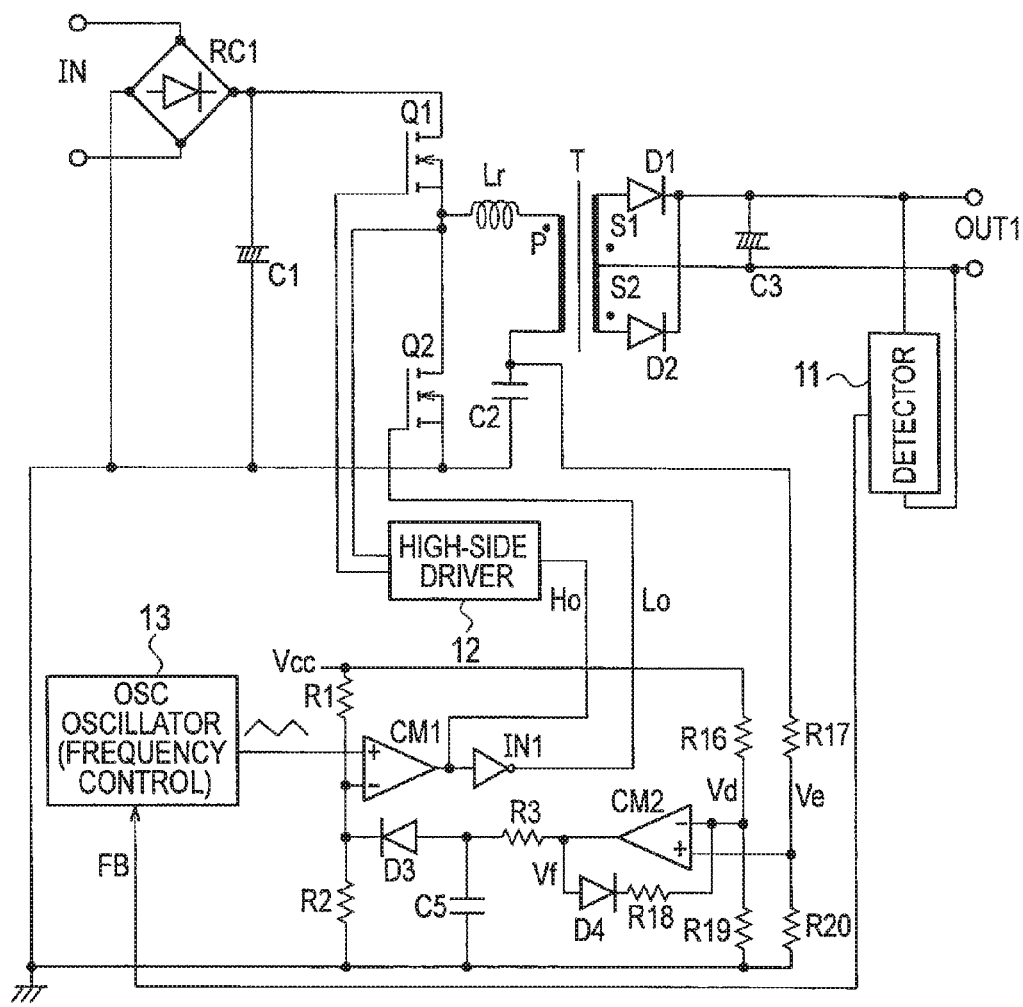
FIG. 15 is a circuit diagram of a current resonance type power supply device according to Embodiment 5 of the present invention.

FIG. 15 is a circuit diagram of a current resonance type power supply device according to Embodiment 5 of the present invention. The current resonance type power supply device of Embodiment 5 illustrated in FIG. 15 is characterized by including a sixth ON time controller including the capacitor C5, the resistors R3, R16 to R20, the diodes D3, D4, and a comparator CM2, in addition to the configuration of the conventional current resonance type power supply device illustrated in FIG. 1.

The sixth ON time controller sets one of the first ON time of the switch element Q1 and the second ON time of the switch element Q2, shorter than a predetermined time, and sets the other of the first ON time and the second ON time longer than the predetermined time, under light-load conditions, based on a value of voltage obtained by the resistor dividing and detecting the voltage of the capacitor C2.

One end of the resistor R17 is connected to one end of the capacitor C2 and one end of the primary winding P, and one end of the resistor R20 and a non-inverting input terminal of the comparator CM2 are connected to the other end of the resistor R17. One end of the resistor R16 and one end of the resistor R19 are connected to an inverting input terminal of the comparator CM2, the other end of the resistor R16 is connected to the power supply Vcc, and the other end of the resistor R19 is grounded.

A series circuit of the resistor R18 and the diode D4 is connected across the inverting input terminal and an output terminal of the comparator CM2. One end of the resistor R3 and an anode of the diode D4 are connected to the output terminal of the comparator CM2. One end of the capacitor C5 and an anode of the diode D3 are connected to the other end of the resistor R3. A cathode of the diode D3 is connected to one end of the resistor R1 and one end of the resistor R2.

Figure 16:
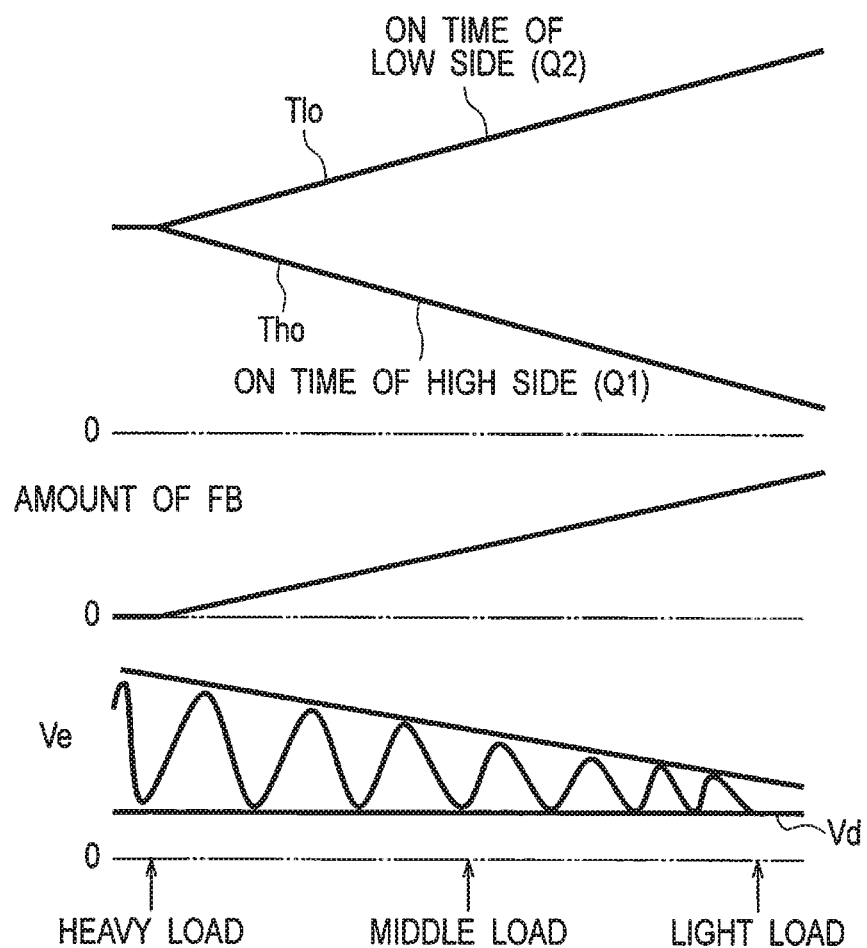
FIG. 16 is a graph illustrating changes in the ON time of a low-side switch element and the ON time of a high-side switch element, the amount of feedback, and the like of the current resonance type power supply device according to Embodiment 5 of the present invention under heavy load, under middle load and under light load.

Next, detailed description will be given with reference to FIGS. 15 and 16 with regard to operation of the current resonance type power supply device of Embodiment 5 thus configured.

First, when the switch element Q1 is ON, a current flows through the primary winding P of the transformer T via the switch element Q1, and thus, the capacitor C2 is charged, and a voltage Ve is generated in the resistor R20 through the resistor R17. The comparator CM2 compares a divided voltage Vd obtained by dividing the voltage of the power supply Vcc by the resistor R16 and the resistor R19, with a voltage across ends of the resistor R20.

Under light-load conditions, the voltage generated in the resistor R20 is higher than the voltage under heavy-load conditions, and thus, an output from the comparator CM2 under light-load conditions is greater than the output under heavy-load conditions. Thus, under light-load conditions, the voltage of the capacitor C5 becomes higher, and thus, the reference voltage at the junction of the resistor R1 and the resistor R2 becomes higher.

When a triangular wave signal from the oscillator 13 is equal to or more than the reference voltage, the comparator CM1 outputs a high level to the switch element Q1. Under light-load conditions, the reference voltage is higher than the reference voltage under heavy-load conditions, and thus, a high level period becomes short, so that the ON time of the switch element Q1 becomes short.

Meanwhile, the inverter IN1 inverts the output from the comparator CM1, and thus, when the triangular wave signal from the oscillator 13 is less than the reference voltage, the inverter IN1 outputs a high level to the switch element Q2. In other words, under light-load conditions, the reference voltage is higher than the reference voltage under heavy-load conditions, and thus, the ON time of the switch element Q2 becomes long.

Therefore, the current resonance type power supply device of Embodiment 5 can also achieve the same effect as that of the current resonance type power supply device of Embodiment 1. FIG. 17 illustrates waveforms of the portions under light load.

According to the present invention, the first ON time controller sets one of the first ON time of the first switch element and the second ON time of the second switch element, shorter than the predetermined time, under light-load conditions, based on a DC voltage detected by the detector. Thus, it is possible to provide the current resonance type power supply device which reduces the charging/discharging current of the current resonance capacitor under light-load conditions thereby to reduce the loss and thus improve the efficiency.

Note that the present invention is not limited to the current resonance type power supply devices of Embodiments 1 to 5. In the current resonance type power supply device of Embodiment 5, a power supply of the resistor R16 is supplied by the power supply Vcc; however, for example, one end of the resistor R16 may be connected to one end of the smoothing capacitor C1 and the output end of the full-wave rectifier circuit RC1 so that the smoothing capacitor C1 supplies the power supply to the resistor R16. Even with such a configuration, the same effect as that of Embodiment 5 can be achieved. Also, the present invention may use a combination of the current resonance type power supply devices of Embodiments 1 to 5.

What is claimed is:

1. A current resonance type power supply device, comprising:
    a first switch element and a second switch element connected in series across ends of a DC power supply;
    a series circuit connected to a junction of the first switch element and the second switch element and to one end of the DC power supply, and having a series connection of a reactor, a primary winding of a transformer, and a capacitor;
    a full-wave rectifier/smoothing circuit configured to perform full-wave rectification and smoothing on a voltage generated in a secondary winding of the transformer thereby to extract a DC voltage;
    a control circuit configured to set a first ON time of the first switch element and a second ON time of the second switch element to a same predetermined time thereby to alternately turn on and off the first switch element and the second switch element, and configured to control a switching frequency of the first switch element and the second switch element according to a value of the DC voltage;
    a voltage detector configured to detect a voltage of the capacitor; and
    an ON time controller configured to set one of the first ON time and the second ON time shorter than the predetermined time and set the other of the first ON time and the second ON time longer than the predetermined time, under light-load conditions, based on a value of the voltage of the capacitor detected by the voltage detector.

2. The current resonance type power supply device according to claim 1, wherein the reactor is formed of a leakage inductance of the transformer.

\* \* \* \* \*